(12) United States Patent
Howell, II et al.

(10) Patent No.: US 10,781,000 B2
(45) Date of Patent: Sep. 22, 2020

(54) APPARATUS AND PROCESS FOR FORMING WATER SOLUBLE POUCHES

(71) Applicant: The Procter & Gamble Company, Cincinnati, OH (US)

(72) Inventors: David Stuart Howell, II, Washington Township, OH (US); Nathan Alan Gill, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 294 days.

(21) Appl. No.: 15/626,551

(22) Filed: Jun. 19, 2017

(65) Prior Publication Data
US 2018/0362193 A1 Dec. 20, 2018

(51) Int. Cl.
*B65B 1/16* (2006.01)
*B65B 39/00* (2006.01)
(Continued)

(52) U.S. Cl.
CPC ............... *B65B 1/16* (2013.01); *B29C 51/10* (2013.01); *B29C 51/24* (2013.01); *B29C 51/262* (2013.01);
(Continued)

(58) Field of Classification Search
CPC .... B65G 17/06; B65G 17/066; B65G 17/068; B65G 17/086; B65G 17/067; B65B 9/04; B65B 9/042; B65B 9/045; B65B 29/022; B65B 29/025; B65B 1/02; B65B 1/16; B65B 2230/02; B65B 59/005; B65B 59/04; B65B 47/10; B29C 51/10; B29C 51/105;
(Continued)

(56) References Cited

U.S. PATENT DOCUMENTS 449,464 A * 3/1891 Cook ............................ 198/850
614,847 A * 11/1898 Dick ...................... B65G 23/44
198/816
(Continued)

FOREIGN PATENT DOCUMENTS

DE 676557 C * 6/1939 ............. B65G 17/38
EP 1375351 A1 1/2004
(Continued)

OTHER PUBLICATIONS

International Search Report for International Application Serial No. PCT/US2018/038200, dated Aug. 28, 2018, 18 pages.

*Primary Examiner* — Stephen F. Gerrity
*Assistant Examiner* — Joshua G Kotis
(74) *Attorney, Agent, or Firm* — Gary J. Foose (57) ABSTRACT

An apparatus including: a plurality of forming molds, each mold including: a leading edge; a trailing edge; a mold face; a plurality of first recesses in the mold face positioned across the mold face, each first recess in fluid communication with a first vacuum duct; a leading face extending from the leading edge in a direction away from the mold face; a trailing face extending from the trailing edge in a direction away from the mold face; wherein at least a portion of the leading face is recessed relative to the mold face proximal the leading edge or at least a portion of the trailing face is recessed relative to the mold face proximal the trailing edge; wherein the plurality of forming molds is arranged leading edge to trailing edge as a first mold belt.

15 Claims, 8 Drawing Sheets

(51) Int. Cl.
| | |
|---|---|
| *B65B 51/18* | (2006.01) |
| *B65B 47/10* | (2006.01) |
| *B29C 51/24* | (2006.01) |
| *B29C 51/36* | (2006.01) |
| *B29C 51/26* | (2006.01) |
| *B29C 51/10* | (2006.01) |
| *B65B 9/04* | (2006.01) |
| *C11D 17/04* | (2006.01) |
| *B65B 1/48* | (2006.01) |
| *B65B 39/14* | (2006.01) |
| *B65B 51/10* | (2006.01) |
| *B29L 31/00* | (2006.01) |
| *B65B 47/02* | (2006.01) |

(52) U.S. Cl.
CPC ............. *B29C 51/36* (2013.01); *B65B 9/042* (2013.01); *B65B 39/007* (2013.01); *B65B 47/10* (2013.01); *B65B 51/18* (2013.01); *C11D 17/042* (2013.01); *B29C 2791/006* (2013.01); *B29L 2031/7128* (2013.01); *B29L 2031/7174* (2013.01); *B65B 1/48* (2013.01); *B65B 39/14* (2013.01); *B65B 47/02* (2013.01); *B65B 2039/009* (2013.01); *B65B 2051/105* (2013.01); *B65B 2230/02* (2013.01)

(58) Field of Classification Search
CPC ............. B29C 51/24; B29C 2791/006; C11D 17/042–045; B65H 2406/3124
USPC ......... 53/559, 560, 453, 454, 561, 579, 900; 198/850–853, 689.1, 698
See application file for complete search history.

(56) References Cited

U.S. PATENT DOCUMENTS

| | | | | |
|---|---|---|---|---|
| 1,723,357 | A * | 8/1929 | Koopman | A01D 61/00 |
| | | | | 198/690.2 |
| 1,883,528 | A * | 10/1932 | Buck | B65G 17/067 |
| | | | | 198/822 |
| 2,689,638 | A * | 9/1954 | Mojonnier | B65B 35/24 |
| | | | | 198/831 |
| 3,381,445 | A * | 5/1968 | Vogt | B29C 51/10 |
| | | | | 118/DIG. 4 |
| 3,388,525 | A * | 6/1968 | Thesing | B65B 9/12 |
| | | | | 53/477 |
| 3,533,215 | A * | 10/1970 | Ollier | B65B 29/10 |
| | | | | 53/282 |
| 3,592,334 | A * | 7/1971 | Fleischauer | B65G 21/2036 |
| | | | | 198/629 |
| 4,637,508 | A * | 1/1987 | Kikuchi | B65G 17/005 |
| | | | | 198/803.2 |
| 4,718,541 | A * | 1/1988 | Wilding | A24B 3/00 |
| | | | | 198/699.1 |
| 4,729,469 | A * | 3/1988 | Lapeyre | B65G 17/08 |
| | | | | 198/834 |
| 5,042,647 | A * | 8/1991 | Tyler | B65G 17/067 |
| | | | | 198/822 |
| 5,074,102 | A * | 12/1991 | Simpson | B65B 9/04 |
| | | | | 141/144 |
| 5,264,230 | A * | 11/1993 | Swanson | B29C 51/225 |
| | | | | 426/413 |
| 5,682,733 | A | 11/1997 | Perrone | |
| 6,216,853 | B1 * | 4/2001 | Fujita | B65G 15/42 |
| | | | | 198/847 |
| 6,282,866 | B1 * | 9/2001 | Natterer | B65B 7/164 |
| | | | | 198/833 |
| 6,874,300 | B2 | 4/2005 | Di Lauretis et al. | |
| 7,127,874 | B2 | 10/2006 | Viltro et al. | |
| 7,677,015 | B2 | 3/2010 | Kroese et al. | |
| 8,048,318 | B1 | 11/2011 | Mogan | |
| 8,156,713 | B2 | 4/2012 | Catlin et al. | |
| 8,435,935 | B2 | 5/2013 | Catlin et al. | |
| 8,662,880 | B2 * | 3/2014 | Fowler | B65B 9/042 |
| | | | | 425/388 |
| 2010/0025200 | A1 * | 2/2010 | Fandella | B29C 45/0017 |
| | | | | 198/850 |
| 2013/0219832 | A1 * | 8/2013 | Pallotta | B65B 9/00 |
| | | | | 53/455 |
| 2015/0336691 | A1 | 11/2015 | Fowler et al. | |
| 2017/0088298 | A1 | 3/2017 | McLenithan et al. | |
| 2017/0368580 | A1 * | 12/2017 | Brandt | B08B 5/02 |

FOREIGN PATENT DOCUMENTS

| | | |
|---|---|---|
| EP | 1504994 B1 | 7/2007 |
| WO | WO2011061628 A1 | 5/2011 |
| WO | WO2013190517 A3 | 2/2014 |

* cited by examiner

APPARATUS AND PROCESS FOR FORMING WATER SOLUBLE POUCHES

FIELD OF THE INVENTION

Process and Apparatus for forming Water Soluble Pouches

BACKGROUND OF THE INVENTION

Water soluble substrate treatment agent pouches are becoming the laundry and dish product form of choice for many consumers. Consumers enjoy being able to use the substrate treatment agent, which may be a detergent composition, without having to come into contact with the substrate treatment agent since some of these agents may have a slimy feel and may be difficult to rinse from their skin. Substrate treatment agent pouches may contain one or more of powder composition, liquid composition, and combinations thereof.

A typical process used to form pouches containing a substrate treatment agent is to provide a bottom continuous web of water soluble film carried on a mold having one or more recesses and conforming the film to the recesses of the mold so that the web has a plurality of compartments. The compartments can be at least partially filled with liquid or powder substrate treatment agent.

After the substrate treatment agent resides in the compartment, a second continuous web of water soluble film is placed over the first continuous web and the second continuous web is bonded to seal landings between the compartments in the first continuous web to form an array of pouches. The array of pouches may extend in one or more of the machine direction and or cross direction. Downstream of the forming and filling operations the array of pouches is cut in one or more of the machine direction and or cross direction to provide individual pouches.

Multi-chamber pouches having two or more separate chambers are also gaining in popularity with consumers. Multi-chamber pouches help to solve the problems associated with formula components that are incompatible with one another when provided in a single mixture. Incompatible formula components can be placed in separate chambers and when the multi-chamber pouch is used, the formula components can be combined when components of the multi-chamber pouch dissolve.

Multi-chamber pouches in which one chamber is superposed on and bonded to another chamber are practical because such pouches may be more physically stable than multi-chamber pouches in which the pouches are arranged in a side by side or concentric arrangement and have a smaller footprint compared to side by side arranged multi-chamber pouches.

Multi-chamber superposed pouches are challenging to manufacture because at some point in the typical manufacturing process employed to make such pouches, one of the chambers must be turned upside-down and bonded to the other chamber or a portion of the web forming the other chamber. If the chamber being turned upside-down is formed on a cylindrical drum, there is only a short window at the apex of the cylindrical drum to both fill and close such chamber. The short window for filling and sealing on the apex of the cylindrical drum becomes the rate limiting step in the process of forming superposed pouches. If the rate of filling and sealing is simply increased, there is potential for splashing and dripping from the filling process, which can interfere with bonding the webs together to form the pouch. Further, the time for bonding the webs together to form the pouch is decreased, which can result in a decrease in or lack of integrity of the bond between the webs. Further, if the cylindrical drum upon which one chamber is formed is used to bond such chamber to another chamber, there may be limited contact time between that drum and the bearing surface to form the bond.

Forming the chamber that needs to be turned upside-down on a continuous molding belt can help to increase the rate of filling and sealing and the quality of sealing. The belt may be formed of a flexible material having a plurality of recesses. The belt traverses two or more rollers as each recess transitions from a right-side-up position to an upside-down position and back to a right-side-up position. One problem with continuous belts is that the materials used to form such belts are prone to fatigue failure arising from the repetitive bending and straightening of the belt as it traverses the rollers. Forming belts are expensive to replace and the downtime required to replace such belts limits the productivity gains that can be obtained from employing such continuous belts.

With these limitations in mind there is a continuing unaddressed need for machines and processes for forming superposed water soluble pouches that can be operated at higher speeds with less downtime than current machines and processes and limits or avoids strain on the film as the film traverses a curve.

SUMMARY OF THE INVENTION

An apparatus (10) comprising: a plurality of forming molds (20), each said mold comprising: a leading edge (30) extending in a cross direction (CD); a trailing edge (40) extending in said cross direction; a mold face (50) extending from said leading edge to said trailing edge in a machine direction (MD) orthogonal to said cross direction; a plurality of first recesses (60) in said mold face positioned across said mold face in a said cross direction, each said first recess in fluid communication with a first vacuum duct (70); a leading face (80) extending from said leading edge in a direction away from said mold face; a trailing face (90) extending from said trailing edge in a direction away from said mold face; wherein at least a portion of said leading face is recessed relative to said mold face proximal said leading edge or at least a portion of said trailing face is recessed relative to said mold face proximal said trailing edge; wherein said plurality of forming molds is arranged leading edge to trailing edge as a first mold belt (100).

DETAILED DESCRIPTION OF THE INVENTION

Figure 1:
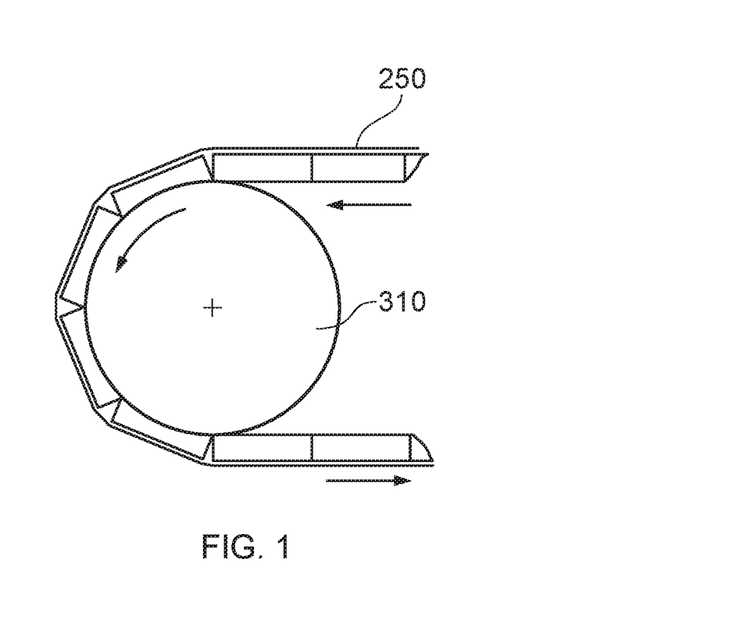
FIG. 1 is a plurality of forming molds passing by a roller.

FIG. 1 illustrates a plurality of forming molds 20 having a rectangular cross-section carrying a water soluble first web 250 traversing a roller 310. For molds 20 shaped and connected as shown, as the molds traverse by or over a roller 310 with which the molds 20 are operatively engaged to traverse a curved path, the web 250 is strained since the path that the first web 250 travels by, over, on, or around the roller 310 is longer than the path the forming mold 20 travels by, over, or around the roller. The tighter the turn by, over, around, or on the roller 310, the greater the strain on the first web 250. As the first web 250 is strained, the thickness of the first web decreases. If the strain on the first web 250 is too high, the first web may be weakened, torn, or wrinkled.

The magnitude of strain on the web 250 decreases with increasing diameter of the roller 310. Increasing the diameter of the roller 310 results in the apparatus taking up more space, which is inefficient. Further, even if the roller 310 is large, the web 250 is strained to some degree, which may weaken or deform the web 250.

Figure 2:
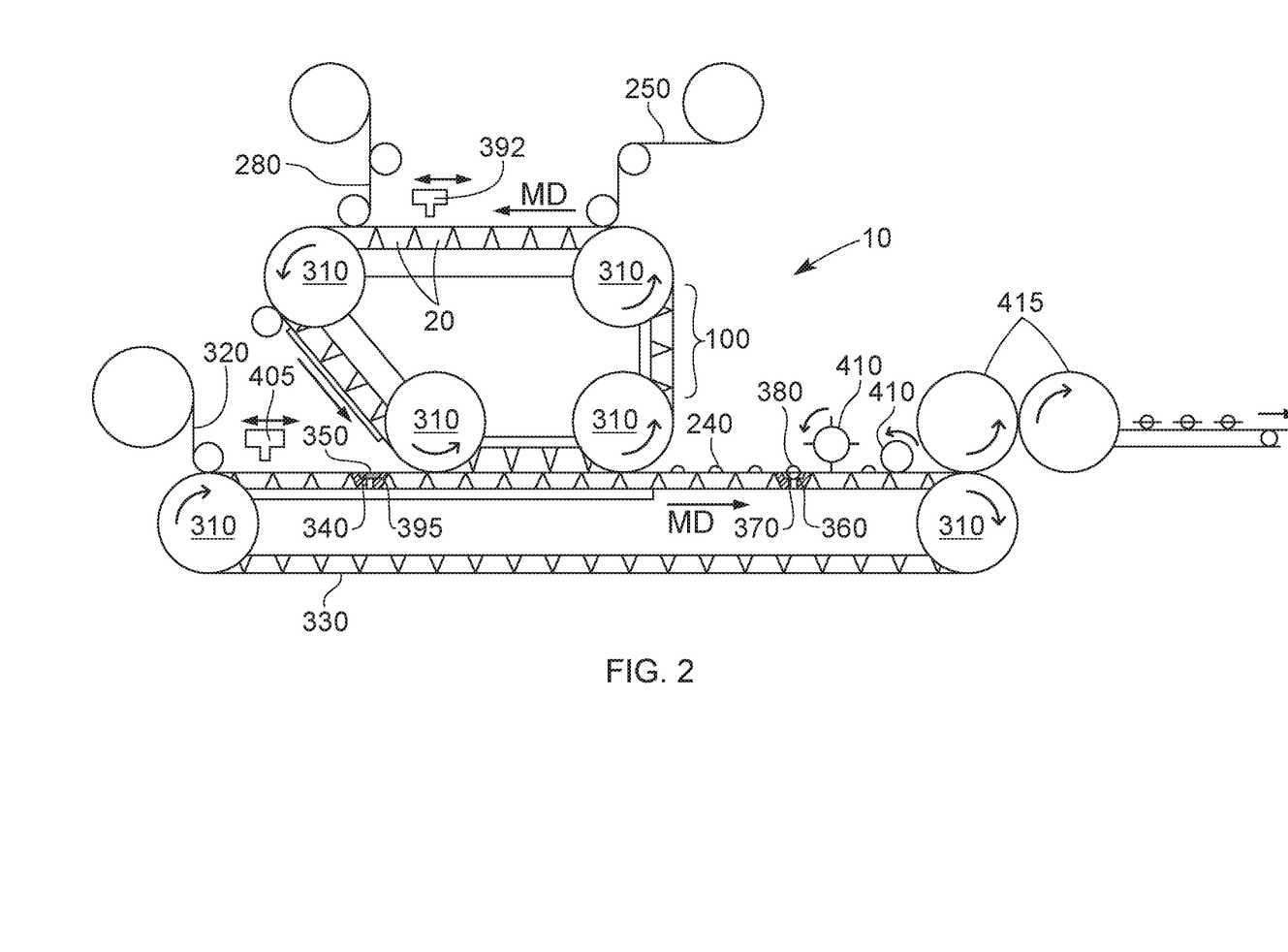
FIG. 2 is an apparatus for forming superposed water soluble pouches.

An apparatus 10 for forming superposed water soluble pouches that can be operated at high speed is shown in FIG. 2. The apparatus 10 shown in FIG. 2 can be referred to as a belt-above-belt apparatus. In a belt-above-belt apparatus 10, the top compartment or compartments are formed on one sub-apparatus and the bottom compartment or compartments are formed on another sub-apparatus. In the apparatus 10 shown in FIG. 2, the top sub-apparatus for forming the top compartment or compartments can operate in the counterclockwise direction. The bottom sub-apparatus for forming the bottom compartment or compartments can operate in the clockwise direction.

A water soluble first web 250 is fed to the apparatus 10. The first web 250 can be a water soluble film. The first web 250 may be provided from a parent roll of such material. The parent roll may have a cross-direction across which multiple lanes of water pouches 240 can be made. The water soluble first web 250 may be fed through a system of rollers and or tensioners onto the first mold belt 100. The first mold belt 100 can comprise a plurality of forming molds 20. The water soluble first web 250 is formed into recesses in the mold faces of the forming molds 20. Once the water soluble first web 250 is conformed to the first recess, the deformed portion of the water soluble first web 250 forms a first compartment. A first substrate treatment agent can be placed into the first compartment, for instance by a first nozzle 392. The first nozzle 392 may be engaged with a reciprocating shuttle that moves the nozzle back and forth in the machine direction MD. The reciprocating shuttle may be a variable speed shuttle to reduce the inertial forces associated with reciprocating movements. For instance, upon a change in direction, the acceleration may gradually increase until the desired velocity is obtained. In advance of the shuttle reversing direction, the deceleration may gradually increase until the shuttle stops and reverses direction. Movement of the shuttle may be provided with a reciprocating servo motor with electronic controls. Movement of the shuttle may be synchronized or nearly synchronized with movement of the first web 250 for some duration over which filling of the first compartments occurs.

Downstream of where the first compartment in the first web 250 is filled, a water soluble second web 280 can be fed to the apparatus 10. The second web 280 can be provided in the same manner as the first web 250. The second web 280 can be the same material as the first web 250 or differ from the first web 250 in one or more properties.

The second web 280 is sealed to the first web 250 around the peripheries of the recesses in the forming molds 20. The second web 280 can be sealed to the first web 250 by solvent sealing, heat sealing, a combination thereof, or other methods for joining webs of materials. For solvent sealing a small amount of solvent is applied to one or both the first web 250 and second web 280 and the two webs are contacted to one another in the land areas between the recesses. The solvent can be water. The solvent can be parent material of one or both of the first web 250 and second web 280 in a liquid state. The solvent can be solution of water and the parent material of one or both the first web 250 and second web 280.

After the first compartment is closed to form a first pouch, the closed first pouch may be turned upside-down and fed towards another portion of the apparatus 10 to be joined with a second compartment 340 to form a superposed water soluble pouch 240.

A water soluble third web 320 can be provided to the apparatus as well. The water soluble third web 320 can be provided in the same manner as the first web 250 and or second web 280. The third web 320 can be the same material as one or both of first web 250 and second web 280 and be provided as a parent roll of material.

The third web 320 can be fed through a system of rollers and or tensioners onto a second mold belt 330. The second mold belt 330 can comprise a plurality of second recesses 390. The second recesses 390 can be provided in a plurality of forming molds 20 or as a continuous belt in the machine direction MD. The third web 320 is formed into the second recesses 390 to form a second chamber 370. Once the third web 320 is conformed to the second recess 390, the deformed portion of the third web 320 forms a second compartment 340. A second substrate treatment agent 350 can be placed into the second compartment 340, for instance by a second nozzle 405. The second nozzle 405 can be configured and operated in the same manner as the first nozzle 392 with respect to reducing inertial forces associated with acceleration and operating in a reciprocating manner.

The closed first pouch can be superposed on the second compartment 340 to close the second compartment. The closed first pouch can be bonded to the peripheries of the second compartments 340, for instance by solvent sealing, heat sealing, a combination thereof, or other methods for joining webs of material. The second compartment 340 when closed can form the second pouch 360. Together, the first pouch and the second pouch 360 can form the superposed pouch 380. Optionally, the second compartments 340 can be closed with a fourth web and the second web 280 can be bonded to the fourth web to form a superposed pouch 380 comprising four webs.

Once the superposed pouch 380 is formed, the superposed pouches 380 can be separated from one another by cutting, for instance by one or more rotary knives 410. The knife 410 can be die cutter. The knives can be a rotary knife 410 configured to cut in the cross direction a knife 410 configured to cut in the machine direction MD. Vacuum takeoff drums 415 can be used to lift off and transfer pouches 380 to a downstream conveyor.

The apparatus can be configured to have a takeoff apparatus to remove the superposed pouches 380 from the apparatus and move them downstream to packing operation.

The water soluble webs used in the process may be heated prior to vacuum forming to a temperature between about 25° C. to about 150° C., or optionally 100° C. to about 135° C.

Figure 3:
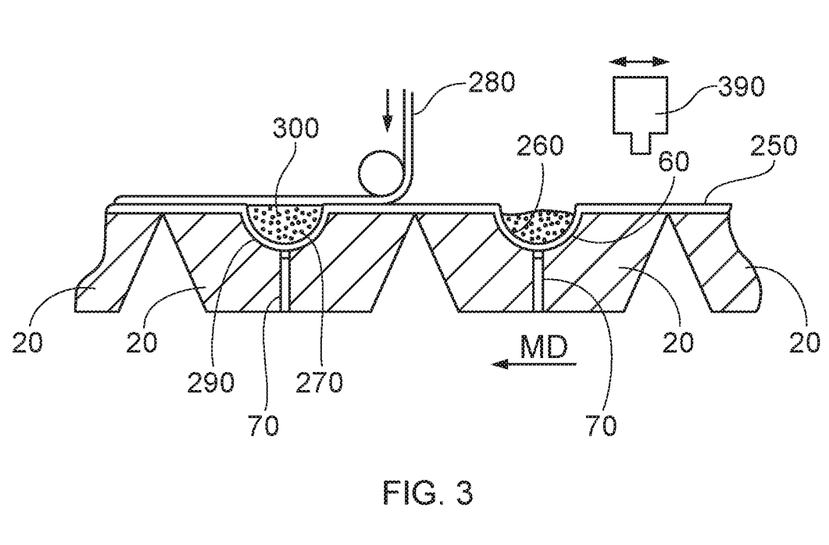
FIG. 3 is cross section view of forming molds.

A portion of a first mold belt 100 is shown in FIG. 3. The forming molds 20 are rendered in cross section. As shown in FIG. 3, the first web 250 is laid down on the first mold belt 100. The first web 250 is formed to the forming molds 20. The first web 250 may be formed to the forming molds by applying vacuum to the first web 250 via a vacuum duct 70 provided in the forming molds 20. As the first web 250 is moved in the machine direction MD by the first mold belt 100, the first web 250 is formed into a first compartment 260 by conforming the first web 250 to the first recesses 60. A first nozzle 392 can provide a first substrate treatment agent 270 into the first compartment 260. The first nozzle 392 may be mounted on a reciprocating shuttle. The second web 280 is placed upon the first web 250 and bonded thereto to form a first pouch 290.

Providing a first mold belt 100 that comprises a plurality of independently attachable and detachable forming molds 20 can provide production flexibility to the apparatus 10 and process. For instance, first pouches 290 having different shapes can be made on the same apparatus 10 by having forming molds 20 that have first recesses 60 that are shaped differently from one another. Depending on the demand for different shaped first pouches 290, forming molds 20 having particular shapes can be changed in or out easily to meet the demand.

Another advantage of providing a first mold belt 10 that comprises a plurality of independently attachable and detachable forming molds 20 is that if one of the forming molds 20 is damaged, only that forming mold 20 needs to be changed out to address the production deficiency.

High speed production of superposed pouches 380 is desirable. A process that employs a cylindrical forming surface can be rate limiting since the time to fill and close a compartment formed on such surface may be limited to when the compartment resides at the top of the cylindrical forming surface. A belt above belt process in which the forming molds 20 have a generally rectangular cross section along the machine direction MD poses certain challenges as discussed previously in regard to FIG. 1.

Figure 4:
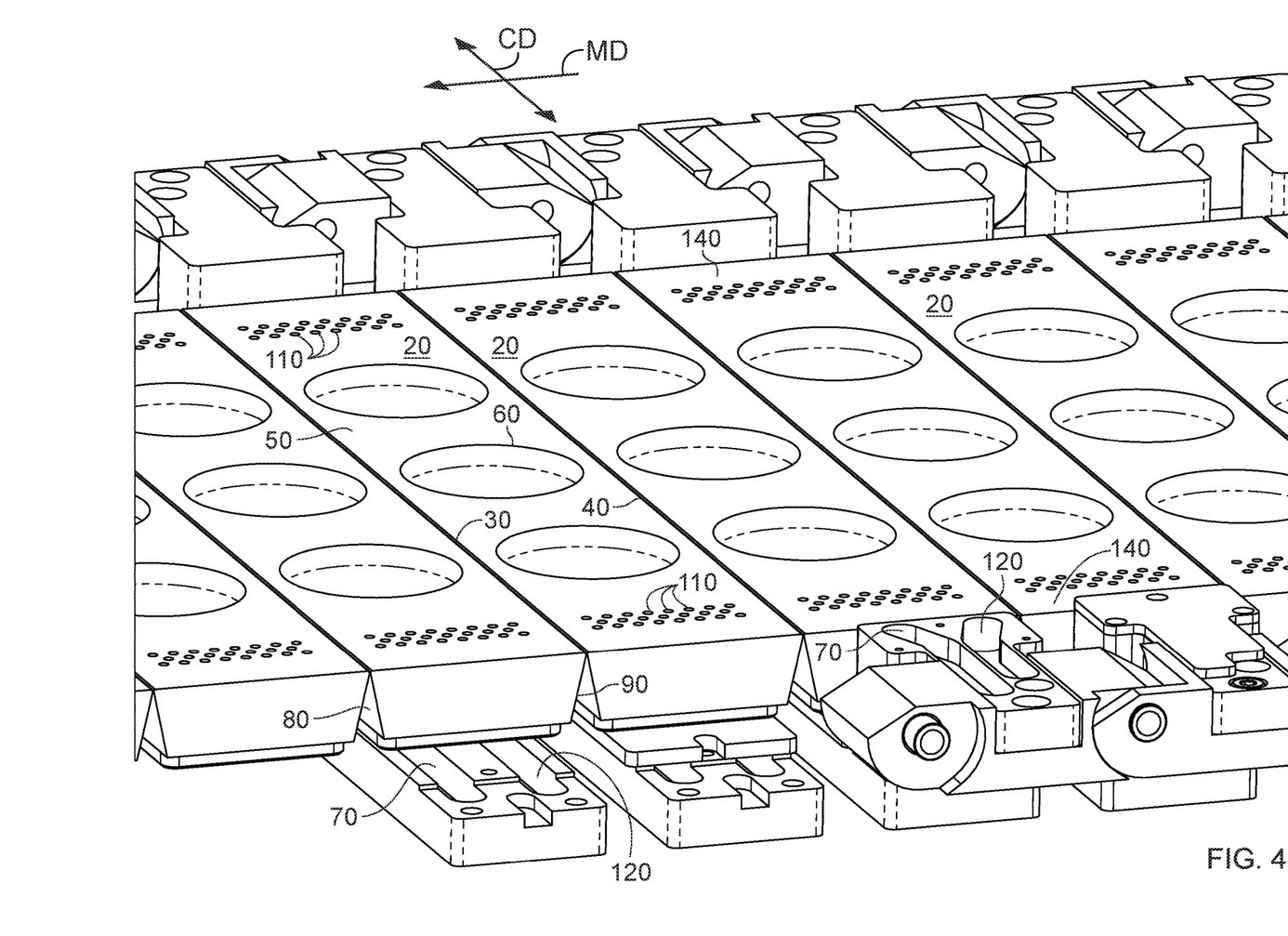
FIG. 4 is a portion of a forming belt. Portions of the forming belt are removed to illustrate a possible approach for assembling the forming molds, manifold trays, and vacuum linkages.

To overcome these problems, among others, the apparatus 10 can comprise a plurality of forming molds 20 as shown in FIG. 4. Each forming mold 20 can comprise a leading edge 30 extending in the cross direction CD. The cross direction CD is orthogonal to the machine direction MD. The leading edge 30 can be thought of as the part of the forming mold 20 that leads the mold 20 as the mold 20 moves in the machine direction. Each forming mold 20 can also comprise a trailing edge 40 extending in the cross direction CD. The trailing edge 40 follows the leading edge 30 through the apparatus 10 and process.

The forming molds 20 can have a mold face 50 extending from the leading edge 30 to the trailing edge 40 in the machine direction. The mold face 50 is the surface of the mold facing upward toward the first nozzle 392 upon which the first web 250 is placed and formed.

The forming molds 20 can have a plurality of first recesses 60 in the mold face 50. The first recesses 60 can be positioned across the mold face 50 in the cross direction CD. Providing a plurality of first recesses 60 in the cross direction can be practical for increasing the capacity of apparatus 10 in a cost-effective manner since all of the drive elements are needed regardless of the width of the apparatus in the cross direction CD. The plurality of first recesses 60 can be aligned with one another in the cross direction CD. This may provide for simple dosing of the first substrate treatment agent. Optionally the first recesses 60 can be staggered relative to one another, which might be practical depending on the mechanism used to dispense the first substrate treatment agent.

The first recesses 60 can be in fluid communication with a first vacuum duct 70. The first vacuum duct 70 serves to provide an exit for the air in the first recess 60 as the first web 250 is conformed to the first recess 60. The first web 250 can be conformed to the first recess 60 by applying a pressure greater than atmospheric pressure to the upper surface of the first web 250 or apply a pressure less than atmospheric pressure to the lower surface of the first web 250. To apply a pressure less than atmospheric pressure to the lower surface of the first web 250 a vacuum can be applied to the first vacuum duct 70.

The first recesses can have a plan view area from about 4 $mm^2$ to about 10000 $mm^2$. The first recesses can have a plan view area from about 800 $mm^2$ to about 5000 $mm^2$.

The forming molds 20 have a leading face 80 extending from the leading edge 30 in a direction away from the mold face 50. The leading face 80 is the face of the forming mold 20 facing in the machine direction MD. All, a portion of, or portions of the leading face 80 can be recessed relative to the mold face 50 proximal the leading edge. That is, all, a portion of, or portions of the leading face 80 can be undercut relative to the leading edge.

The forming molds 20 also have a trailing face 90. The leading face 80 precedes the trailing face 90 as the forming mold 20 moves in the machine direction. The leading face 80 and the trailing face 80 of an individual forming molds 20 oppose one another in the machine direction. The trailing face 90 extends from the trailing edge 40 in a direction away from the mold face 50. Like the leading face 80, all, a portion of, or portions of the trailing face 90 can be recessed relative to the mold face 50 proximal the trailing edge 40.

The plurality of forming molds 20 can be arranged leading edge 30 to trailing edge 40 as a first mold belt 100. Forming molds 20 arranged next to one another can be positioned such that the trailing edge 40 of a downstream forming mold 20 is next to the leading edge 30 of an upstream forming mold 20. The trailing edge 40 of the upstream forming mold 20 is next to a leading edge 30 of the next forming mold 20 upstream. Trailing edge 40 to leading edge 30, the pattern repeats until the trailing edge 40 of the last up stream forming mold 20 is next to the leading edge 30 of the leading downstream mold 20 to complete the first mold belt 100, the same as a chain on a bicycle.

The forming molds 20 can have opposing ends 140 in the cross direction CD. Proximal each opposing end 140 there can be one or more apertures 110 in fluid communication with a second vacuum duct 120. Vacuum can be applied to the second vacuum duct 120 to create a vacuum at or in the apertures 110 at the opposing ends 140 to hold down the first web 250 to the opposing ends 140 of the mold face 50. Vacuum in either or both of the vacuum ducts can be provided a negative gage pressure from about 5 mbar to about to about 500 mbar. Vacuum in the second vacuum duct can bet set at a negative gage pressure from about 5 mbar to about 150 mbar below atmospheric pressure. Each of the apertures 110 can have an area from about 0.1 $mm^2$ to about 2 $mm^2$. Similarly, the bottom of the recesses can be provided with apertures connected to the vacuum duct and the apertures can have an area from about 0.1 $mm^2$ to about 2 $mm^2$.

Figure 5:
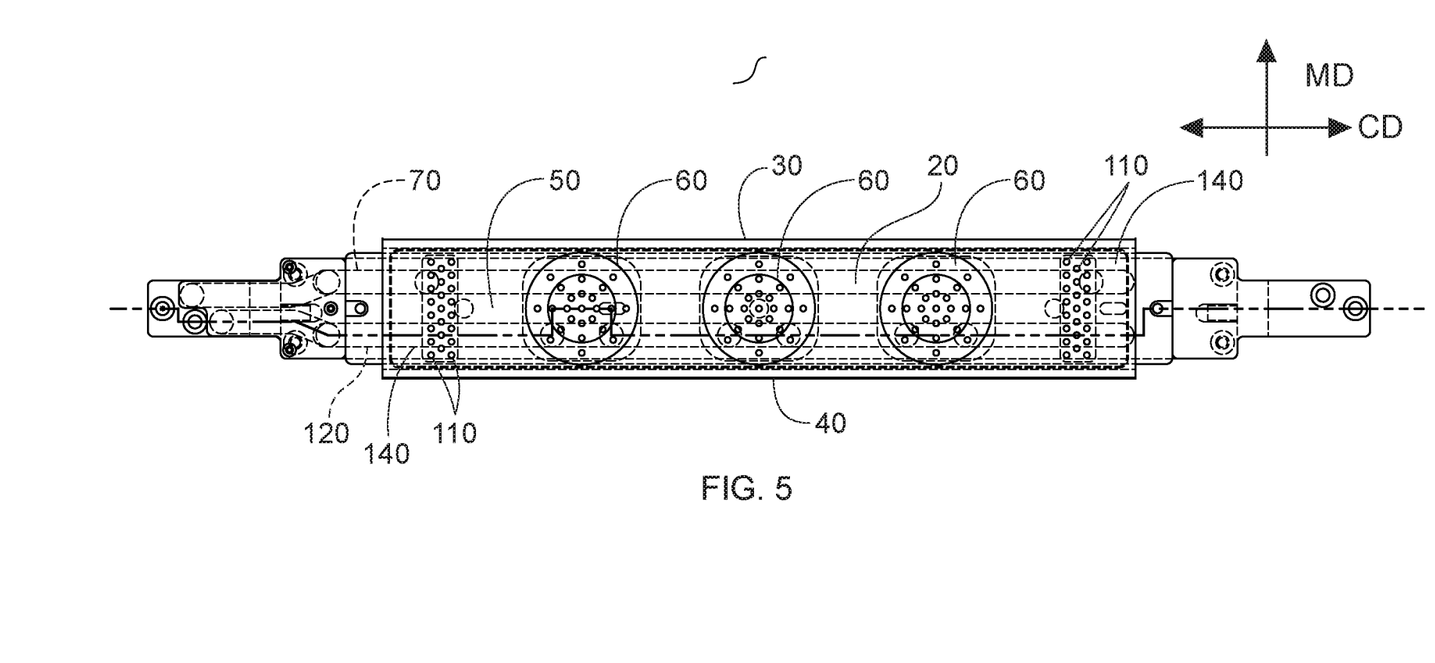
FIG. 5 is a top view of a forming mold.

A top view of a forming mold 20 is shown in FIG. 5.

Figure 6:
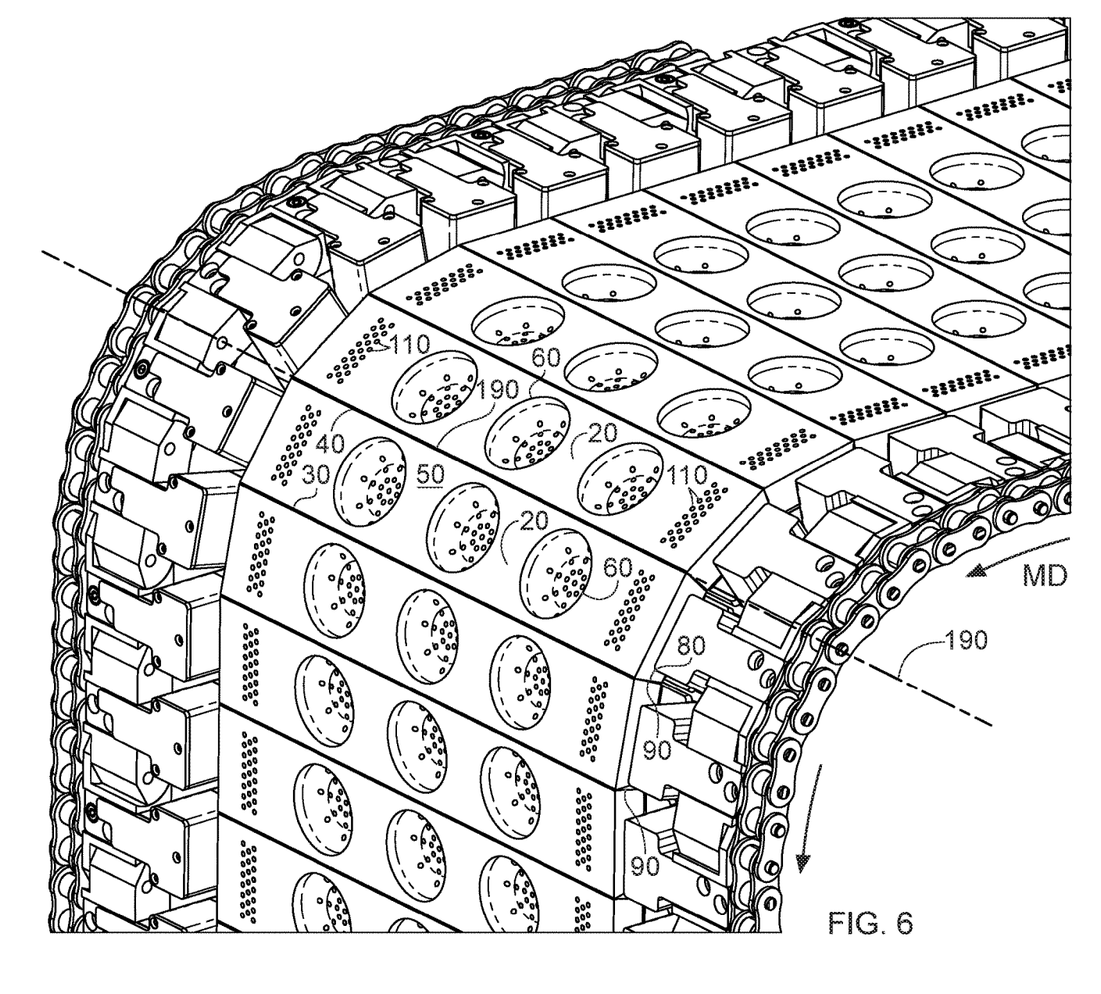
FIG. 6 is a portion of a forming belt traversing a curved path illustrating how the forming molds can tip towards one another about an inflection axis.

By providing all, a portion of, or portions of the leading face 80 and or trailing face 90 of the forming molds 20 being undercut relative to the mold face 50 provides for space between the forming molds 20 that allows forming molds 20 next to one another to be folded towards one another as such adjacent forming molds 20 traverse by or over a curve of a roller 310 in the machine direction MD along a curved path, for instance as shown in FIG. 6.

Between adjacent forming molds 20 is an inflection axis 190. The inflection axis 190 is at or between the trailing edge of the leading mold 200 and the leading edge of the trailing mold 210. The trailing mold 210 is upstream of the leading mold 200. The trailing mold 210 follows the leading mold 200 in the machine direction MD.

Pairs of forming molds 20 can be thought of as having a first position and a second position. In the first position, the trailing face 90 of the leading mold 200 is rotationally away from the leading face 80 of the adjacent trailing mold 210 about the inflection axis 190. In the second position, the trailing face 90 of the leading mold 200 is rotationally towards the leading face 80 of the adjacent trailing mold 210 about the inflection axis 190.

Upstream of the roller 310, the leading mold 200 and trailing mold 210 are positioned relative to one another so that the mold faces 50 of the two molds in plane with one another. That arrangement can provide for a flat, substantially continuous surface, accounting for in small gaps between leading molds 200 and trailing molds 210, to lay the first web 250 upon. The first web 250 can be positioned on the flat mold belt 100. After the first web 250 is on this mold belt 100, a pressure difference, for instance vacuum, can be applied to the apertures 110 at the opposing ends of the forming molds 20 to hold down the first web 250. Then a pressure difference, for instance vacuum, can be applied to the first recesses 60 in the mold faces 50 to draw the first web 250 into the first recesses 60 to form first compartments 260. The first substrate treatment agent 270 can be placed into the first compartments 260. Afterwards, the second web 280 can be provided and sealed to the first web 250. The first compartments 260 can each have a volume from about 0.1 mL to about 50 mL.

As the mold belt 100 approaches a roller 310, the trailing face 90 of a downstream forming mold 20 can rotate towards the leading face 80 of an upstream forming mold 20 about the inflection axis 190. As this occurs, the mold face 50 of the downstream forming mold 20 and the mold face 50 of the upstream forming mold 20 can form a substantially continuous polygonal surface upon which the first web 250 can be carried with only a small magnitude of strain or even zero strain on the first web 250 as it is bent across the inflection axis 190. A functionally insignificant discontinuity between the upstream forming mold 20 and the downstream forming mold 20 at the inflection axis 190 between the two may arise as the two forming molds 20 are pivoted towards one another about the inflection axis 190.

Again, considering the immediately aforesaid downstream forming mold 20 and upstream forming mold 20, as both of these forming molds 20 traverse a curved path, the trailing face 90 of the downstream forming mold 20 and the leading face 80 of the upstream forming mold 20 rotate relatively towards one another about the inflection axis 190. And the mold face 50 of the downstream forming mold 20 and the mold face 50 of the upstream forming mold 20 form a substantially continuous polygonal surface upon which the first web 250 can be carried with small or zero strain on the first web 250.

As the forming molds 20 traverse a curved path, the mold faces 50 of the forming molds 20 traversing the curved path form a polygonal surface. That polygonal surface is the surface upon which the first web 250 is carried.

Once the forming molds 20 have traversed the curved path and resume a straight line path the trailing face 90 of the downstream forming mold 20 and the leading face 80 of the upstream forming mold 20 open up relative to one another by pivoting about the inflection axis 190.

All, a portion of, or portions of both the leading face 80 extending from the leading edge 30 can be recessed relative to the mold face 50 proximal the leading edge 30 and the trailing face 90 recessed relative to the mold face 50 proximal the trailing edge 40. This can be practical for allowing adjacent forming molds 20 to be bent around a curved path and still maintain a substantially continuous polygonal surface for carrying the first web 250. This in contrast to arrangement like that shown in FIG. 1 in which a substantial discontinuity between the downstream forming mold 20 and the upstream forming mold 20 opens up as the adjacent forming molds 20 are travel a curved path.

Optionally, the leading face 80 extending from the leading edge 30 can be recessed relative to the mold face 20 proximal the leading edge 20 or the trailing face 90 extending from the trailing edge 40 can be recessed relative to the mold face 20 proximally the trailing edge 40.

Figure 7:
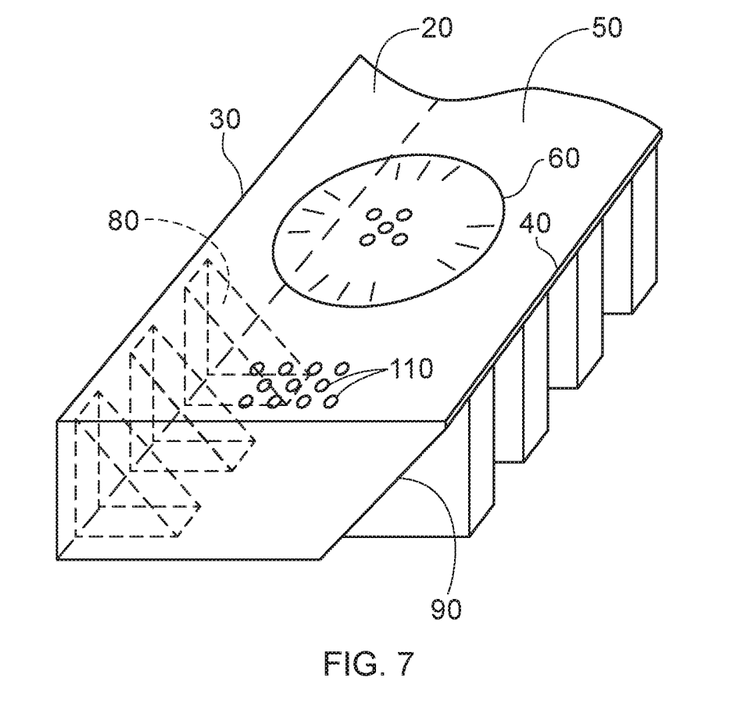
FIG. 7 is a portion of a forming mold illustrating an optional construction having recessed faces and projections that are offset from projections of the downstream forming mold and upstream forming mold.

The portion or portions of the leading face 80 and or trailing face 90 that are recessed relative to the leading edge 30 and trailing edge 40, respectively, need not extend across the entire cross direction CD of the forming mold 20, by way of non-limiting example as shown in FIG. 7. For instance, a portion or portions of the trailing face 90 of the downstream forming mold 20 that is or are recessed can be offset from the portion or portions of the leading face 80 of the upstream forming mold 20 that is or are recessed. Arranged as such, the upstream forming mold 20 and downstream forming mold 20 can nest with one another as the trailing face 90 of the downstream mold and the leading face 80 of the upstream mold can move relative towards and away from one another by rotation about the inflection axis 190 at or between the trailing edge 40 and leading edge 30.

At least a portion of the leading face 80 can be recessed relative to the mold face 20 proximal the leading edge 30 or at least a portion of the trailing face 90 can be recessed relative to the mold face 50 proximal the trailing edge 40.

The trailing face 90 can be recessed relative to the mold face 20 proximal the trailing edge 40 and or the leading face 80 can be recessed relative to the mold face 20 proximal the leading edge 30. The underlying need is for there to be some space to accommodate rotation of one or both of the trailing face 90 of the downstream forming mold 20 and the leading face 80 of the upstream forming mold 20 toward one another about the inflection axis 190 to allow the first mold belt 100 to bend around a curve and have the mold faces 50 form a substantially continuous polygonal surface to carry a web or webs thereupon with little or no strain.

Figure 8:
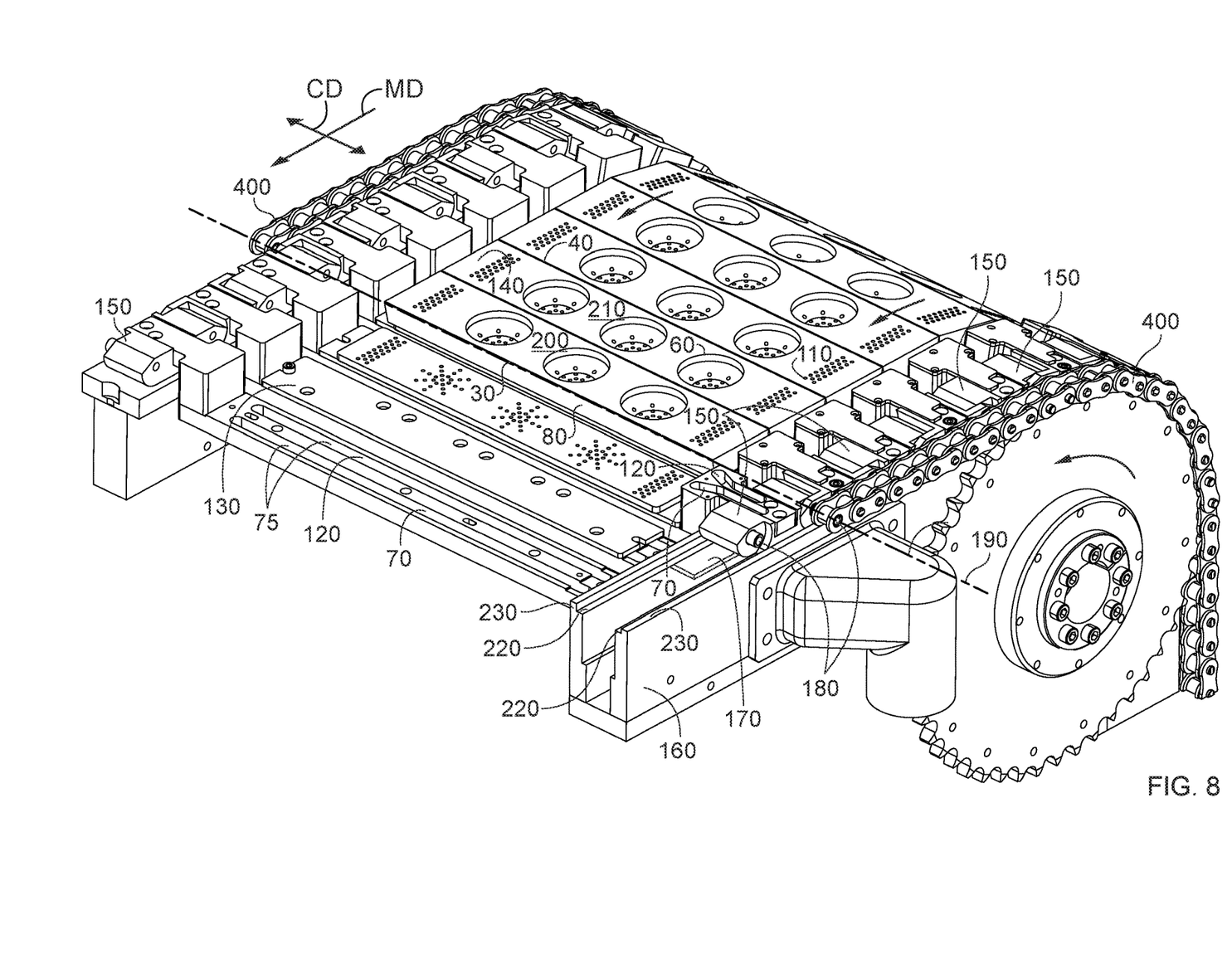
FIG. 8 is a portion of a forming belt. Portions of the forming belt are removed to illustrate a possible approach for assembling the forming molds, manifold trays, vacuum linkage, and manifold.

The forming molds 20 can be attachable and detachable from a manifold tray 130, by way of non-limiting example as shown in FIG. 8. The forming molds 20 can be comprised of an assembly of parts that are assembled by adhering, welding, joining, screwing, magnets, or otherwise engaging the parts with one another. The manifold tray 130 can serve to provide fluid communication between the manifold 160 and the first vacuum duct 70 and the second vacuum duct 120, if present. The manifold tray 130 can have manifold ducts 75 to provide fluid communication from the manifold 160 to one or both of the opposing ends 140 of the forming molds 20. A further benefit of the manifold tray 130 is that it can provide easy repair and replacement of individual forming molds 20 if they become worn or damaged. Further, unlike a continuous mold belt in which individual forming molds 20 cannot be individually attached and detached from the belt, forming molds 20 that are attachable and detachable from a manifold tray 130 can be easily changed in and changed out to provide the ability to manufacture of a variety of different shaped pouches 240 on the same apparatus 10 and easily the alter the proportion of manufactured pouches 240 having a particular shape.

The first vacuum duct 70 can be in fluid communication with the manifold 160. Providing a manifold 160 can be practical for applying vacuum pressure from a single source to multiple locations, which can simplify manufacturing control of the apparatus.

The plurality of forming molds 20 can traverse by or over a roller 310 with which the plurality of forming molds 20 is operatively engaged to traverse a curved path. The forming molds 20 can be in fluid communication with the manifold 160 or a combination of manifolds 160 upstream of the roller 310, by or along the roller 310, and downstream of the roller 310. This can be practical for keeping vacuum pressure on the first recesses 60, and apertures 110 if present, so that the first pouch 290 and the associated first web 250 and second web 280 remain engaged with the mold faces 50 and first recesses 60 as the forming molds are partially or fully inverted.

Vacuum can be applied to the forming molds 20 in a variety of ways. For instance, the manifold 160 can be positioned immediately beneath the forming mold 20. If positioned as such, the path that the forming molds 20, or manifold trays 130 if provided, take as the mold belt 100 traverses a curved path may require that the forming molds 20, or manifold trays 130 if provided, has a portion extending from the bottom of the forming mold 20, or manifold tray 130 if provided, that fits into or over the manifold 160 and is sealingly engaged with the manifold 160. Or the bottom of the forming mold 20, or manifold tray 130 if provided, may have a curved surface to conform with a manifold 160 that is curved in the machine direction MD.

Another option is to position the manifold 160 so that it is offset from the path the forming molds 20 travel. To engage the first vacuum duct 70 with the manifold 160, a vacuum linkage 150 can be provided. Each of the forming molds 20 can have opposing ends 140 in the cross direction CD. At least one of the opposing ends 140 can be engaged with the vacuum linkage 150 and the first vacuum duct 70 can pass through the vacuum linkage 150 to the manifold 160. Providing the manifold 160 at one of the opposing ends 140 can be practical because with the manifold 160 out of the way, other structures the forming molds 20 can be slid over another surface or travel over a roller or rollers to provide bearing resistance when webs of material are bonded to one another on the forming molds 20.

A vacuum linkage 150 can be practical since linkages have the ability to closely conform to a curve and maintain vacuum without significant leakage. For instance, a bicycle chain is a linkage and can conform to a chain ring having a curved perimeter. The shorter the vacuum linkages 150 in the machine direction MD, the more closely the vacuum linkages 150 can conform to the curve of a curved manifold 160. As shown in FIG. 6, the vacuum linkages 150 can be connected to one another in the machine direction MD by through pins 180. Each of the through pins 180 can be axially aligned with the inflection axis 190 at or between the trailing edge 40 of a leading mold 200 and the leading edge 30 of a trailing mold 210, the leading mold 200 being adjacent the trailing mold 210.

Aligning the through pins 180 with the inflection axis 190 between adjacent forming molds 20 can be practical so that adjacent vacuum linkages 150 deform in concert with the mold faces 50 when the trailing face 90 of a leading mold 200 and the leading face 80 of an adjacent trailing mold 210 rotate towards and away from one another about the inflection axis 190. This also simplifies transmission of motive force from a drive train to the forming molds 20 to move them in the machine direction MD. Having the through pins 180 aligned with the inflection axis 190 can allow for the strain in the web carried thereupon to be small, nearly zero, or even zero.

The through pins 180 can be engaged with a drive train 400. The drive train 400 can be a chain that is engaged with a driving sprocket connected to a motor. Arranged as such, the motive force applied can be applied substantially coincident with the inflection axis 190. This can provide for inflection axis 190, vacuum linkages 150, and drive train 400 to move in concert with one another along a curved path while allowing the trailing edge 40 of a leading mold 20 and the leading edge 30 of a trailing mold 210 remain in close proximity to one another and maintain a substantially continuous surface across the inflection axis 190 between adjacent forming molds 20.

If a second vacuum duct 120 is provided, both the first vacuum duct 70 and second vacuum duct 120 can pass through the vacuum linkage 150 to the manifold 160. The manifold 160 can be a single chamber manifold 160. If the vacuum pressure applied to the first vacuum duct 70 needs to be different from the vacuum pressure applied to the second vacuum duct 120, a multi-chamber manifold 160 can be practical. Or if the same vacuum pressure is suitable for both vacuum ducts, a single chamber manifold 160 can be practical.

The timing of when vacuum is applied to the vacuum ducts can be controlled by leaving open and blocking certain portions of the surface of the manifold 160 over which the vacuum ducts travel. This can be further facilitated by having the first vacuum duct 70 and the second vacuum duct 120 offset from one another in the cross direction CD and providing a manifold 160 that has a shield 170 engageable with one of the vacuum ducts. If the second vacuum duct 120 is in fluid communication with the apertures 110 located proximal the ends 140, it can be practical for the shield 170 to be engageable with the first vacuum duct 70 over a portion of the manifold 160 at a location at which the manifold 160 is in fluid communication with the second vacuum duct 120.

The shield 170 on the manifold 160 can be used to turn on and off vacuum to vacuum duct associated with the shield. In one mode of operation of the apparatus, it can be desirable that once the first web 250 is placed on the forming molds, vacuum pressure can be applied to the second vacuum duct 120. That vacuum pressure can be transmitted by the second vacuum duct 120 to the apertures 110 located proximal the ends 140 of the forming molds 20. This can provide an effective hold down force along the edges of the first web 250 and secures the first web 250 to the mold belt 100.

Once the first web 250 is secured to the mold belt 100 and as the forming mold 20 traverses further along the manifold 160 downstream of the shield 170, vacuum pressure can be applied to the first vacuum duct 70 to deform the first web 250 into the first recesses 60.

The manifold 160 can have a manifold surface 220 parallel to a plane defined by the machine direction MD and the cross direction CD. The manifold 160 can further comprise manifold ledges 230 on opposing sides of the manifold 160 projecting out of such plane. The manifold surface 220 is the surface of the manifold 160 that the vacuum linkages 150 slide over thereby bring one or more of the first vacuum duct 70 and second vacuum duct 120 in fluid communication with the manifold 160. Optionally, if vacuum linkages 150 are not employed, the forming molds 20, or manifold trays 130 if present, may slide directly over this manifold surface 220 to provide fluid communication from one or both of the first vacuum duct 70 and second vacuum duct 120.

The forming molds 20, or manifold trays 130 if employed, or vacuum linkages 150 if employed, or whatever structure is used to provide fluid communication between the manifold 160 and one or both of the first vacuum duct 70 and second vacuum duct 120, can be nested between the manifold ledges 230. This nesting can be helpful for maintaining vacuum pressure on the first vacuum duct 70 and second vacuum duct 120. Further, as the mold belt 100 is bent around a curve, since individual segments are being bent about such curve it can be difficult to provide for exact conformance between the manifold surface 220 and structure that conveys vacuum press to the first vacuum duct 70 and second vacuum duct 120. The manifold ledges 230 only need to project high enough above the manifold surface 220 so that the forming molds 20, or manifold trays 130 if employed, or vacuum linkages 150 if employed, or whatever structure is used to provide fluid communication between the manifold 160 and one or both of the first vacuum duct 70 and second vacuum duct 120 remain sufficiently sealed to the manifold surface 220 maintain vacuum pressure where desired.

The manifold 160 can have a plurality of chambers having different levels of vacuum. This can allow for control of deformation of the web as it is drawn into conformance with the forming mold 20.

The apparatus 10 can be employed to make a plurality of water soluble pouches 240. A water soluble first web 250 can be provided on the mold belt 100. The first web 250 can be formed into the first recesses 60 to form first compartments 260 by applying a pressure difference across the first web 250. The pressure difference can be conveniently applied by vacuum applied to the first recesses through the first vacuum ducts 70 using a manifold tray 130 and manifold 160 as described herein or otherwise. Alternatively, a positive pressure can be applied to the top surface of the first web 250 to force the first web 250 to conform to the first recesses 60, the first recesses 60 having a vent in their base to allow air to escape as the first web is forced down into the first recess 60.

Once the first web 250 is conformed to the first recesses 60 to form first compartments 260, a first substrate treatment agent 270 can be place into the first compartments 260. A water soluble second web 280 can be provided and sealed to the first web 250 to form an enclosed first pouch 290. The first pouch 290 can have a first chamber 300 defined by the deformed first web 250 and the second web 280. The first substrate treatment agent 270 can be between the first web 250 and the second web 280. The second web 280 can be above the first web 250.

The mold belt 100 can be rolled by or over one or more rollers 310 to move the mold belt 100 along a curved path. This movement can position the first pouch 290 so that the second web 280 is below the first web. As the belt 100 rolls by or over the one or more rollers 310, one or both of the trailing face 90 of the leading mold 200 and or the leading face 80 of the trailing mold 210 can move towards one another by rotation about the inflection axis 190 at or between the trailing edge 40 of the leading mold 200 and the leading edge 30 of the trailing mold 210, the leading mold 200 being adjacent the trailing mold 210.

The trailing face 90 of the leading mold 200 and the leading face 80 of the trailing mold 210 can both move towards one another relatively by rotation about the inflection axis 190 as well. This can be practical if both the leading face 80 and trailing face 90 of a forming mold are undercut relative to the mold face 50. This can also be practical if the forming molds 20 are provided with portions of the trailing face 90 of the downstream mold 20 that are recessed and staggered out of phase with portions of the leading face 80 of the upstream forming mold 20 that are recessed so that the downstream forming mold 20 and upstream forming mold 20 can nest with one another as they traverse a curved path.

To form a superposed pouch 380, a water soluble third web 320 can be provided and formed into one or more second recesses 395 of a second mold belt 330 to form second compartments 340. A second substrate treatment agent 350 can be placed into the second compartments 340. The second web 280 can be sealed to the third web 320 to form an enclosed second pouch 360. The second pouch 360 can have a second chamber 370 containing the second substrate treatment agent 350. The first pouch 290 can be superposed upon and bonded to the second pouch 360 to form a superposed pouch 380. The first web 250 second web 280, and third web 320 can be cut so that the superposed pouches 380 are separate from one another.

In the process for making a plurality of water soluble pouches 240, as described herein, vacuum can be applied to the second vacuum duct 120 before vacuum is applied to the first vacuum duct 70. The second vacuum duct 120, if present, is fluid communication with the apertures 110. By applying vacuum to the second vacuum duct 120 before vacuum is applied to the first vacuum duct 70, the edges of the first web 250 in the cross direction CD can be held down on the forming molds 20 before the first web 250 is drawn into the first recesses 60. This can provide for better control of the forming process and reduce the chance of uncontrolled stretching and or wrinkling.

Each of the mold faces 50 has opposing ends in the cross direction CD. The forming molds 20 can have at each opposing end in the cross direction CD one or more apertures 110 in fluid communication with a second vacuum duct 120. One or both opposing ends can be operably engaged with a vacuum linkage 150 having a first vacuum duct 70 and second vacuum duct 120 passing therethrough to a manifold 160. The first vacuum duct 70 and second vacuum duct 120 can be offset from one another in the cross direction CD. Such an arrangement can provide for the ability to independently control application of vacuum to the particular vacuum duct. Control of vacuum can be managed with a shield 170 that is engagable with the second vacuum duct 120 over a portion of the manifold 160 at a location in which the manifold 160 is in fluid communication with the first vacuum duct 70.

Each of the water soluble webs disclosed herein can be, by way of nonlimiting example, the film that is used in TIDE PODS, CASCADE ACTION PACS, CASCADE PLATINUM, CASCADE COMPLETE, ARIEL 3 IN 1 PODS, TIDE BOOST ORIGINAL DUO PACs, TIDE BOOST FEBREZE SPORT DUO PACS, TIDE BOOST FEE DUO PACS, TIDE BOOSE VIVID WHITE BRIGHT PACS, DASH, FAIRY (PLATINUM, ALL-IN ONE, YES (PLATINUM ALL-IN ONE, JAR (PLATINUM, ALL-IN ONE, DREFT (PLATINUM, ALL-IN ONE, manufactured by The Procter & Gamble Company, Cincinnati, Ohio, United States of America. The water soluble webs can have a thickness from about 20 to about 150 microns, or even about 35 to about 125 microns, or even about 50 to about 110 microns, or even about 76 microns or even about 90 microns. The water soluble webs can comprise polyvinyl alcohol.

The water soluble webs can be webs supplied by Monosol under the trade references M8630, M8900, M8779, M8310, films described in U.S. Pat. Nos. 6,166,117 and 6,787,512 and PVA films of corresponding solubility and deformability characteristics. Further water soluble webs can be those described in US2006/0213801, WO 2010/119022 and U.S. Pat. No. 6,787,512. The substrate treatment agents disclosed herein can be by way of nonlimiting example, any of the substrate treatment agents used in the aforesaid products.

Combinations

An example is below:

A. An apparatus (10) comprising:
- a plurality of forming molds (20), each said mold comprising:
  - a leading edge (30) extending in a cross direction (CD);
  - a trailing edge (40) extending in said cross direction;
  - a mold face (50) extending from said leading edge to said trailing edge in a machine direction (MD) orthogonal to said cross direction;
  - a plurality of first recesses (60) in said mold face positioned across said mold face in a said cross direction, each said first recess in fluid communication with a first vacuum duct (70);
  - a leading face (80) extending from said leading edge in a direction away from said mold face;
  - a trailing face (90) extending from said trailing edge in a direction away from said mold face;
  - wherein at least a portion of said leading face is recessed relative to said mold face proximal said leading edge or at least a portion of said trailing face is recessed relative to said mold face proximal said trailing edge;
  - wherein said plurality of forming molds is arranged leading edge to trailing edge as a first mold belt (100).

B. The apparatus according to Paragraph A, wherein each of said molds is attachable and detachable from a manifold tray (130).

C. The apparatus according to Paragraph A or B, wherein said first vacuum duct is in fluid communication with a manifold (160).

D. The apparatus according to Paragraph C, wherein said plurality of molds traverses by or over a roller (310) with which said plurality of molds is operatively engaged to traverse a curved path and said molds are in fluid communication with said manifold or a combination of manifolds upstream of said roller, along said roller, and downstream of said roller.

E. The apparatus according to Paragraph D, wherein each of said molds has opposing ends (140) in said cross direction, wherein at least one of said ends is operably engaged with a vacuum linkage (150) and said first vacuum duct passes through said vacuum linkage to a manifold (160).

F. The apparatus according to any of Paragraphs A to E, wherein each of said mold faces has opposing ends in said cross direction, where proximal each opposing end are one or more apertures (110) in fluid communication with a second vacuum duct (120).

G. The apparatus according to Paragraph F, wherein each of said molds has opposing ends (140) in said cross direction, wherein at least one of said ends is operably engaged with a vacuum linkage (150) and said first vacuum duct and said second vacuum duct pass through said vacuum linkage to a manifold (160).

H. The apparatus according to Paragraph G, wherein said first vacuum duct and said second vacuum duct are offset from one another in the cross direction and said manifold has a shield (170) engageable with said first vacuum duct over a portion of said manifold at a location at which said manifold is in fluid communication with said second vacuum duct.

I. The apparatus according to any of Paragraphs F to H, wherein said vacuum linkages are connected to one another in said machine direction by through pins (180), wherein each said through pin is axially aligned with an inflection axis (190) at or between said trailing edge of a leading mold (200) and said leading edge of a trailing mold (210), said leading mold being adjacent said trailing mold.

J. The apparatus according to Paragraph I, wherein said through pins are engaged with a drive train 400.

K. The apparatus according to any of Paragraphs F to J, wherein said manifold has a manifold surface (220) parallel to a plane defined by said machine direction and said cross direction and manifold ledges (230) on opposing sides of said manifold surface projecting out of said plane, wherein said vacuum linkages are recessed between said manifold ledges.

L. The apparatus according to any of Paragraphs A to K, wherein said plurality of first recesses are aligned with one another in said cross direction.

M. The apparatus according to any of Paragraphs A to L, wherein between adjacent molds is an inflection axis (190) at or between said trailing edge of a leading mold (200) and said leading edge of a trailing mold (210), wherein pairs of said forming molds have a first position and a second position, wherein in said first position said trailing face of leading mold is rotationally away from said leading face of an adjacent trailing mold about said inflection axis and in said second position said trailing face of said leading mold is rotationally towards said leading face of said adjacent trailing mold about said inflection axis.

N. The apparatus according to any of Paragraphs A to M, wherein at least a portion of said leading face is recessed relative to said mold face proximal said leading edge and at least a portion of said trailing face is recessed relative to said mold face proximal said trailing edge.

O. A process for making a plurality of water soluble pouches (240) comprising the steps of:
- providing the apparatus according to any of Paragraphs A to N;
- providing a water soluble first web (250) on said mold belt;
- forming said first web into said first recesses to form first compartments (260) by applying a pressure difference across said first web;
- placing a first substrate treatment agent (270) into said first compartments;
- providing a water soluble second web (280);
- sealing said second web to said first web to form an enclosed first pouch (290) having a first chamber (300) containing said substrate treatment agent, wherein said second web is above said first web;
- rolling said mold belt by or over one or more rollers (310) to move said mold belt along a curved path, thereby positioning said first pouch so that said second web is below said first web, wherein as said mold belt rolls by or over said one or more rollers one or both of said trailing face of a leading mold (200) and said leading face of a trailing mold (210) move towards one another by rotation about an inflection axis (190) at or between said trailing edge of said leading mold and said leading edge of said trailing mold, said leading mold being adjacent said trailing mold.

P. The process according to Paragraph O, further comprising the steps of:
providing a water soluble third web (320) formed into one or more second recesses (390) of a second mold belt (330) to form second compartments (340);
placing a second substrate treatment agent (350) into said second compartments;
sealing said second web to said third web to form an enclosed second pouch (360) having a second chamber (370) containing said second substrate treatment agent, wherein said first pouch is superposed upon and bonded to said second pouch to form a superposed pouch (380);
cutting said first web, said second web, and said third web so that said superposed pouches are separate from one another.

Q. The process according to Paragraph O, wherein each of said mold faces has opposing ends in said cross direction, where proximal each opposing end are one or more apertures (110) in fluid communication with a second vacuum duct (120);
wherein each of said molds has opposing ends (140) in said cross direction, wherein at least one of said ends is operably engaged with a vacuum linkage (150) and said first vacuum duct and said second vacuum duct pass through said vacuum linkage to a manifold (160);
wherein said first vacuum duct and said second vacuum duct are offset from one another in the cross direction and said manifold has a shield (170) engageable with said second vacuum duct over a portion of said manifold at a location at which said manifold is in fluid communication with said first vacuum duct; and
wherein vacuum is applied to said second vacuum duct before vacuum is applied to said first vacuum duct.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus comprising:
a plurality of pairs of adjacent forming molds, each said forming mold comprising:
a leading edge extending in a cross direction;
a trailing edge extending in said cross direction;
a mold face extending from said leading edge to said trailing edge in a machine direction orthogonal to said cross direction;
a plurality of first recesses in said mold face positioned across said mold face in said cross direction, each said first recess in fluid communication with a first vacuum duct;
a leading face extending from said leading edge in a direction away from said mold face; and
a trailing face extending from said trailing edge in a direction away from said mold face; and
wherein at least a portion of said leading face extends from said mold face at said leading edge at an acute angle relative to the mold face or at least a portion of said trailing face extends from said mold face at said trailing edge at an acute angle relative to the mold face;
a roller over which said forming molds traverse;
wherein each pair of adjacent forming molds comprises a leading mold and a trailing mold, wherein the leading mold and the trailing mold are adjacent to each other, and wherein each pair is arranged in a leading edge of said trailing mold to a trailing edge of said leading mold configuration such that the plurality of pairs of adjacent forming molds form a first mold belt;
wherein between adjacent molds of each pair is an inflection axis at or between said trailing edge of said leading mold and said leading edge of said trailing mold;
wherein each pair of adjacent forming molds has a first position upstream of said roller and a second position as said pair of adjacent forming molds traverse said roller;
wherein in said first position said trailing face of said leading mold is rotationally away from said leading face of said trailing mold about said inflection axis and adjacent mold faces are in plane with one another and in said second position said trailing face of said leading mold is rotationally towards said leading face of said trailing mold about said inflection axis;
wherein said inflection axis is in plane with said mold faces of adjacent forming molds; and
wherein each of said mold faces has opposing ends in said cross direction, wherein at each opposing end are one or more apertures in said mold face in fluid communication with a second vacuum duct.

2. The apparatus according to claim 1, wherein each of said molds is attachable and detachable from a manifold tray.

3. The apparatus according to claim 1, wherein said first vacuum duct is in fluid communication with a manifold.

4. The apparatus according to claim 3, wherein said plurality of pairs of adjacent molds is operatively engaged with said roller to traverse a curved path and said molds are in fluid communication with said manifold or a combination of manifolds upstream of said roller, along said roller, and downstream of said roller.

5. The apparatus according to claim 4, wherein each of said molds has opposing ends in said cross direction, wherein at least one of said opposing ends is operably engaged with a vacuum linkage of a plurality of vacuum linkages and said first vacuum duct passes through said vacuum linkage to said manifold.

6. The apparatus according to claim 5, wherein said plurality of vacuum linkages are connected to one another in said machine direction by through pins, wherein each said through pin is axially aligned with an inflection axis at or between said trailing edge of said leading mold and said leading edge of said trailing mold of the respective pair of adjacent molds.

7. The apparatus according to claim 6, wherein said through pins are engaged with a drive train.

8. The apparatus according to claim 5, wherein said manifold has a manifold surface parallel to a plane defined by said machine direction and said cross direction and manifold ledges on opposing sides of said manifold surface projecting out of said plane, wherein each of said plurality of vacuum linkages are recessed between said manifold ledges.

9. The apparatus according to claim 1, wherein at least one of said opposing ends is operably engaged with a vacuum linkage and said first vacuum duct and said second vacuum duct pass through said vacuum linkage to a manifold.

10. The apparatus according to claim 9, wherein said first vacuum duct and said second vacuum duct are offset from one another in the cross direction and said manifold has a shield engageable with said first vacuum duct over a portion of said manifold at a location at which said manifold is in fluid communication with said second vacuum duct.

11. The apparatus according to claim 1, wherein said plurality of first recesses are aligned with one another in said cross direction.

12. The apparatus according to claim 1, wherein at least a portion of said leading face extends from said mold face at said leading edge at the acute angle relative to the mold face and at least a portion of said trailing face extends from said mold face at said trailing edge at the acute angle relative to the mold face.

13. A process for making a plurality of water soluble pouches comprising the steps of:
providing the apparatus according to claim 1;
providing a water soluble first web on said first mold belt;
forming said first web into said first recesses to form first compartments by applying a pressure difference across said first web;
placing a first substrate treatment agent into said first compartments;
providing a water soluble second web;
sealing said second web to said first web to form an enclosed first pouch having a first chamber containing said substrate treatment agent, wherein said second web is above said first web;
rolling said first mold belt by or over one or more rollers to move said first mold belt along a curved path, thereby positioning said first pouch so that said second web is below said first web, wherein as said first mold belt rolls by or over said one or more rollers one or both of said trailing face of the leading mold and said leading face of the trailing mold, of the pairs of adjacent molds rolling over the one or more rollers, move towards one another by rotation about the inflection axis at or between said trailing edge of said leading mold and said leading edge of said trailing mold.

14. The process according to claim 13, further comprising the steps of:
providing a water soluble third web formed into one or more second recesses of a second mold belt to form second compartments;
placing a second substrate treatment agent into said second compartments;
sealing said second web to said third web to form an enclosed second pouch having a second chamber containing said second substrate treatment agent, wherein said first pouch is superposed upon and bonded to said second pouch to form a superposed pouch;
cutting said first web, said second web, and said third web so that said superposed pouches are separate from one another.

15. The process according to claim 13, wherein at least one of said opposing ends of each mold is operably engaged with a vacuum linkage and said first vacuum duct and said second vacuum duct pass through said vacuum linkage to a manifold;
wherein said first vacuum duct and said second vacuum duct are offset from one another in the cross direction and said manifold has a shield engageable with said second vacuum duct over a portion of said manifold at a location at which said manifold is in fluid communication with said first vacuum duct; and
wherein vacuum is applied to said second vacuum duct before vacuum is applied to said first vacuum duct.

* * * * *